United States Patent Office 3,484,223
Patented Dec. 16, 1969

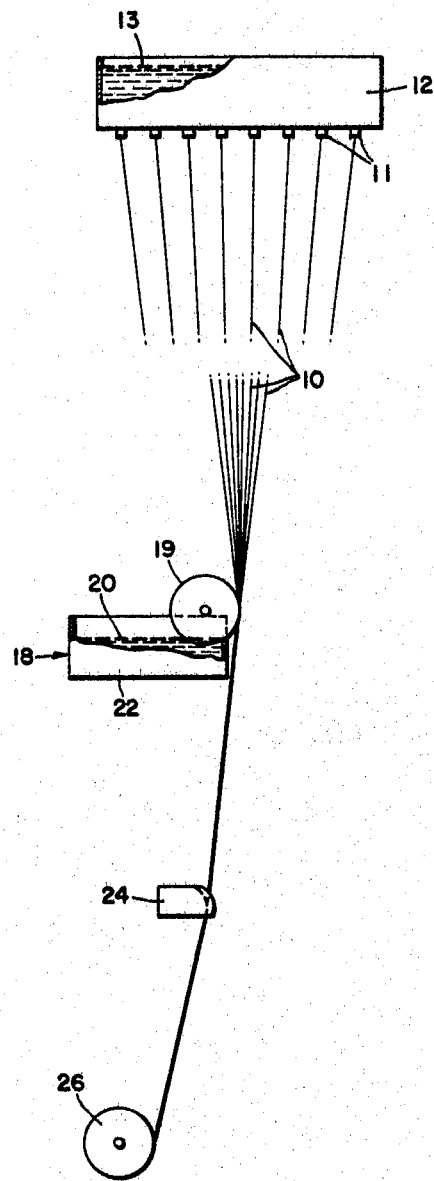

3,484,223
METHOD FOR SIZING GLASS FIBERS
Byron M. Vanderbilt, Westfield, N.J., and James J. Fasnacht, Shaler Township, Allegheny County, Pa.; said Byron M. Vanderbilt, assignor to Esso Research and Engineering Company, a corporation of Delaware, and said James J. Fasnacht assignor to PPG Industries, Inc., a corporation of Pennsylvania
Filed Sept. 8, 1965, Ser. No. 485,857
Int. Cl. C03c 25/02
U.S. Cl. 65—3                                    9 Claims

ABSTRACT OF THE DISCLOSURE

The disclosed invention relates to a method of coating glass fibers with a carrier medium having 1–10% of a solid, non-blocking unsaturated copolymer of a vinylic aromatic, a $C_4$ to $C_8$ diolefin whereas at least 50% is 1,2 or 3,4 type of unsaturation, the average molecular weight being about 1000 to 30,000, additionally, the carrier contains 0.2 to 2% of a hydrolyzable silane.

---

The present invention relates to a glass fiber treatment and, in particular, it relates to sizing compositions for treating glass fibers which are to be used as continuous filaments for the reinforcement of plastics and elastomers.

A glass fiber strand is composed of a multitude of fine glass filaments which are formed by being drawn at a high rate of speed from molten cones of glass located at the tips of small orifices in a bushing such as shown in U.S. Patent No. 2,133,238. During formation, the filaments are coated while moving at a speed of the order of 5,000 to 20,000 feet per minute with an emulsion sizing which includes, among other components, a binder to give the strand integrity for workability, i.e., for twisting, plying and weaving. If the strand does not have proper integrity, fuzzing occurs during these operations and eventually the strand breaks. The sizing emulsion also contains a lubricant for the filaments in order to prevent destruction of the strand by abrasion of the individual filaments against each other or against fiber handling equipment.

It is common practice to use glass fiber cloth as a reinforcement for resins. For such use, the glass fibers are cleaned of the sizing used on the glass during weaving operations and are then coated with a coupling agent or finish material which makes the surface of the glass fibers hydrophobic and compatible with the particular resin with which they are to be employed. These coupling agents may increase the dry flexural strength and greatly improve the water resistance of glass fiber-resin laminates.

A number of silane and siloxane materials have been found to be useful as coupling agents. For example, vinyl and allyl trialkoxy silanes, aminoalkyl and acyloxyalkyl trialkoxy silanes, their hydrolysis products and polymers of the hydrolysis products are suitable for such use. The silanes useful for the present invention are described in further detail later herein.

When the glass fibers are use in the form of strands, i.e., roving or chopped strands, for resin reinforcement, the coupling agent is usually a part of the sizing and applied along with the binder and lubricant to the fibers during their attenuation and forming. Thus, the conventional sizing usually contains a coupling agents, an aqueous dispersion of a film-forming, synthetic resin made by aqueous emulsion polymerization of an ethylenic monomer, for example, polyvinyl acetate latex and a textile lubricant or softener.

Roving is formed by combining a number of strands in parallel form and winding the strands on a tubular support in a manner such that the combined strands may be unwound and used to form woven roving or chopped strands. It is therefore necessary that the strand have good integrity and resistance to fuzzing during the steps employed to make the roving and fabricate it into forms suitable for use as a reinforcement.

It is known in the art to use liquid butadiene-styrene resins as binders in sizing compositions. Examples of pertinent art describing these liquid resins as useful binders are U.K. Patent 840,367 and U.K. Patent 892,091. However, in using such liquid binders in sizings, it is necessary to B-stage the resin during a drying step or subsequent to a drying step. B-staging is a partial cure to convert a liquid resin to a curable solid resin which is more easily handled then the liquid one. This B-stage step is quite critical and results in variations in the sized fibrous strands when in operation on a commercial scale. A further drawback of the use of B-staged resins in sizings for glass fibers is that they tend to be unstable in storage and may undergo additional polymerization or oxidation reactions in storage so that the sizing will become incompatible with plastics and elastomeric stocks.

A sizing composition which is particularly effective and practical as a sizing for fibrous glass used in a variety of reinforced systems has now been found and forms the essence of this invention. The sizing composition of the invention comprises a major proportion of a liquid carrier medium; an unsaturated butadiene-styrene copolymer, having a certain styrene content and molecular configuration so that it is a solid at room temperature, as a binder; a glass fiber lubricating agent; and, an unsaturated or functional silane which functions as a coupling agent. The sizing components are dispersed or dissolved in a suitable carrier media such as water or a suitable organic solvent such as toluene, isopropyl alcohol, or methylene dichloride.

By using such a sizing composition on glass fibers, it is possible to obtain good strand integrity of the glass fibers as well as considerable ease of process control. Moreover, the glass fibers with this particular sizing are suitable for use as reinforcing materials in elastomeric, thermosetting resin and thermoplastic resin stocks.

Thus, the sizing compositions of the invention are extraordinarily noteworthy since they serve an especially important dual role. Not only are they suitable as sizing materials in their own right, meeting all the criteria necessary for good sizing materials, but in their second role, they will form an exceptionally strong chemical bond with either an adhesive elastomeric coating material on the surface of the sized glass fibers or with thermoplastic or thermosetting stocks which are to be reinforced. Fibrous glass fibers with strongly bonded adhesive coatings on their exterior surfaces can be used as reinforcing materials in a wide variety of rubber stocks such as tires, beltings, hosings and the like with considerably stronger bonding to the reinforced elastomeric stock than is normally possible with ordinary fibrous glass reinforcements.

It is preferred when the glass fibers are to be used as reinforcing materials for a rubber stock that the adhesive coating be an elastomer. The adhesive coating is applied as a separate step after application of the sizing composition during the forming step. This is not an adhesive in the usual sense, but rather a way of accomplishing a chemical bonding.

Thus, the adhesive coating is applied on top of the sized glass fibers. In many cases, the butadiene-styrene resin of the size enters into a cross-linking reaction between the silane of the size and the adhesive coating.

In such cases, it may be advantageous to have certain catalysts such as organic peroxides in the sizing. Such sized glass without an adhesive coating is also applicable for use in reinforced plastics, and particularly for reinforcing both thermosetting and thermoplastic stocks of a hydrocarbon nature. The sizing compositions of the invention are also applicable for use as sizings for fibrous glass to be used as textiles.

When such sized glass is to be used for reinforcing elastomer stocks, the elastomeric adhesive coating, cement or latex, is applied around the individual sized filaments of the fibrous glass. When the silane has one or more groups containing a double bond, the elastomeric adhesive coating becomes chemically bonded to the glass through the sizing composition either during drying of the coating or during vulcanization of the elastomeric stock. Certain saturated substituted silanes such as saturated mercapto-alkyl silanes and saturated amino silanes also will covulcanize with an elastomeric adhesive coating that is cured with a conventional curing agent such as zinc oxide or a sulfur compound. In such an instance, the presence of a peroxide would be detrimental. Although the butadiene-styrene copolymer does not enter into this vulcanizing reaction, it will not interfere with the covulcanization reaction between the silane and the elastomer as other conventional sizing materials would do.

This combination of sizing (including silane and binder) plus the adhesive coating of elastomer not only protects the glass filaments against interfilament chafing failures, but also serves to bond the glass fibers into an elastomeric stock.

In general, the technique of bonding an elastomeric coating to the sizing of the invention is described in two papers presented before the Division of Rubber Chemistry of the American Chemical Society in Chicago, Ill., on Sept 4, 1964. The papers are entitled "Then Bonding of Fibrous Glass to Elastomers" by Byron M. Vanderbilt and Robert E. Clayton, and "Glass Fiber Reinforced Elastomers" by Robert E. Clayton and Robert L. Kolek, which papers are incorporated herein by reference in their entirety although so much of them as is necessary to understand the present invention will be repeated herein.

The composition and physical properties of the polymeric binder used in the sizing must satisfy several criteria. These are that it must permit complete coverage of the individual glass filaments by the elastomeric adhesive coating and it must protect the fibrous glass from physical degradation during the handling and processing steps.

Glass fiber lubricants suitable for use in the present invention include fatty acid amines or amide compounds such as a cationic-active, acid solubilized, fatty acid amide. A suitable material is a tetraethylene pentamine-pelargonic acid condensate made soluble with acetic acid and manufactured by I.C.I. (Organics) Inc., formerly Arnold Hoffman Company under the trade name Cirrasol 185-A. It is an anhydrous material which is a deep reddish amber, viscous liquid at room temperature. It is water dispersible and has a pH of 8.9 to 9.4 in a one percent by weight aqueous dispersion. All glass lubricants are usable.

Other commercially available acid solubilized, fatty acid amides are useful as lubricants in the practice of this invention. These include both saturated and unsaturated fatty acid amides wherein the acid group contains from 4 to 24 carbon atoms. Also included are anhydrous, acid solubilized polymers of the lower molecular weight unsaturated fatty acid amides. The lubricant is generally employed in an amount of approximately 0.1 to 1 percent, preferably, 0.2 to 0.4 percent by weight of the aqueous or solvent sizing solution.

Another glass fiber lubricant which can be used in the size is an alkyl imidazoline derivative which includes compounds of the class $\mu$-alkyl N-aminoalkyl imidazolines which may be formed by causing fatty acids to react with polyalkylene polyamines under conditions which produce ring closure. These imidazolines are described more fully in U.S. Patent No. 2,200,815. Other suitable imidazolines are described in U.S. Patents 2,267,965, 2,268,273 and 2,355,837.

If the sizing is applied in emulsion, as is preferable, it must contain a suitable emulsifying agent for the butadiene-styrene copolymer. The emulsifying agent is preferably nonionic and it may also serve as an additional lubricant. The amount of such wetting agent employed generally ranges from about 0.01 to 1, preferably 0.05 to 0.25 wt. percent of the sizing solution.

The total solids content, i.e., copolymer content, of the size is about 1 to 10, preferably 2 to 5 and most preferably 3 to 4.5 percent by weight of the emulsion. In all events, the amounts of the various ingredients should not exceed that amount which will cause the viscosity of the size to be greater than about 100 centipoises at 20° C. Sizes having a viscosity of greater than 100 centipoises at 20° C. are very difficult to apply to glass fiber strands during their formation without breaking the strand. It is preferred that the viscosity of the size be between 1 and 20 centipoises at 20° C. for best results. It is desired to deposit from 0.2 to 5, preferably 0.5 to 2 wt. percent of sizing solids on the glass, based on the weight of the glass.

The silanes useful in the instant invention are defined by the following general structure:

wherein $R_1$ is selected from the group consisting of alkenyl, aminoalkyl, epoxyalkyl, epoxyaryl, epoxyaralkyl, epoxycycloalkyl, mercapto-alkyl, acryloxyalkyl, and methacryloxyalkyl; X is selected from the group consisting of halogen, hydroxyl, and alkoxy; and $R_2$ and $R_3$ are each independently selected from the group consisting of $R_1$, X and methyl. Specific suitable compounds are as follows:

gamma amino-propyl-triethoxysilane,
beta amino-ethyl-triethoxysilane,
gamma amino-propyl-trimethoxysilane,
gamma acryloxypropyl trimethoxysilane,
gamma methacryloxypropyl dimethyl chlorosilane,
gamma (methacryloxyethoxy) propyl trimethoxysilane,
gamma methacryloxypropyl methyl diacetoxysilane,
vinyl trichlorosilane,
vinyl dimethylchlorosilane,
vinyl tris-2-methoxyethoxy silane,
divinyl dichlorosilane,
trivinyl chlorosilane,
divinyl diethoxysilane,
allyl trimethoxysilane,
allyl trichlorosilane,
allyl tris-2-methoxyethoxysilane,
gamma glycidoxypropyl trimethoxysilane,
beta(3,4-epoxy cyclohexyl)ethyl trimethoxysilane,
beta methacryloxyethyl trimethoxysilane,
gamma methacryloxypropyl trimethoxysilane,
beta glycidoxyethyl triethoxysilane,
beta(3,4-epoxy cyclohexyl)ethyl tri(methoxyethoxy) silane,
beta(3-epoxyethyl phenyl)ethyl trimethoxysilane,
beta(epoxyethyl)ethyl triethoxysilane,
4,5-epoxy-n-hexyl trimethoxysilane,
15,16-epoxy-n-hexadecyl trimethoxysilane,
3-methylene,7-methyl-6,7-epoxy octyl trimethoxysilane,
N,N-bis(hydroxyethyl) aminopropyl triethoxysilane glycidoxy-propyl-trimethoxysilane,
beta mercaptoethyl trimethoxysilane,
beta mercaptopropyl trimethoxysilane,
gamma mercaptopropyl trimethoxysilane,
beta(2-mercapto cyclohexyl)ethyl trimethoxysilane,
beta mercaptoethyl triethoxysilane,
gamma mercaptopropyl dimethyl methoxysilane,
beta mercaptoethyl triacetoxysilane, and the like.

The essential feature all silanes useful in this invention possess is a functionality which permits them to engage either in a cross-linking reaction or a copolymerization reaction. This may require some catalytic prompting. In case of these compounds one or more of the $R_2$, $R_3$ or X groups must be hydrolyzed to an (OH) group prior to or after contacting the glass surface. When applied in aqueous dispersion it is likely that all such R and X groups are converted to (OH) groups and these in turn may be converted, at least in part, to siloxane compounds. All of the above silanes are effective even with minute amounts of water and are at least partially converted into the corresponding silanols which may also then be partially converted into their condensation polymers, the siloxanes. Condensation products of the hydrolyzed or partially hydrolyzed silane esters (siloxanes) as well as the silanols are usually believed to be present. The amount of silane will be from 0.2 to 2, preferably 0.4 to 0.9 wt. percent based on the total weight of the sizing solution. Generally, from 0.1 to 2, preferably, 0.3 to 0.75 wt. percent of silane, silanol or siloxane is deposited on the glass surface based on the weight of the glass. The silanes, silanols and siloxanes will be referred to for convenience as "silanes."

The sizing composition can also contain from 1 to 6%, preferably 2 to 4%, by weight based on the copolymer solids of a free radical generating curing agent. Such curing agents are desirably peroxides of low vapor puressure, such as dialkyl, arylalkyl or diaryl peroxides, e.g., dicumyl peroxide, 2,6-dimethyl-2,5-di-t-butyl peroxy hexane and paradicumyl di-t-butyl peroxide; alkyl peresters, e.g., di-t-butyl perphthalate and di-t-butyl benzoate; etc. Preferred curing agents are dicumyl peroxide and 2,5-dimethyl-2,5-di-t-butyl peroxy hexane which are stable and nonvolatile under the normal conditions for drying the sized glass fiber in hot air ovens. Normal drying conditions are 100° to 300° F. at atmospheric pressure in an air circulating oven for 12 to 24 hours or for a sufficient time to remove all of the water. Lower drying temperatures, e.g., 70° F. are possible by drying in a vacuum oven or blowing with air for an extended period of time, in which case peroxides having lower decomposition or half-life temperatures may be employed.

A suitable antioxidant or stabilizer must be included in the sizing composition in order to avoid prepolymerization or oxidation of the sizing prior to use in the reinforced elastomer or plastic. Use of 0.1 to 3%, preferably 0.5 to 1.0% of a hindered phenol, an organic phosphite, or an amine based on total solids in the sizing, is employed, in a preferable embodiment. These are weight percents.

In general, the specific butadiene-styrene copolymers used as binders in the sizes of the invention should be resinous in nature, solid at below about 125° F. and become soft and fluid-like at temperatures above about 200° F. Their molecular weight should not be higher than about 15,000.

Such solid copolymers should not contain over about 50% styrene by weight, the unsaturation of the copolymer resulting from the butadiene constituent should be at least 50% of the 1,2-type, and they are preferably prepared by the block or graft copolymerization technique. These methods of copolymerization result in solid copolymers with a lower proportion of styrene than solid polymers would have with random polymerization methods.

Although butadiene-styrene copolymers are especially preferred, the butadiene can be substituted by other $C_4$ to $C_8$ conjugated diolefins, especially $C_5$ and $C_6$ conjugated diolefins. The styrene may be completely replaced by homologs of styren, such as a vinyl toluene or a dimethyl styrene; and replaced to a small extent by minor proportions of other monoolefinic monomers, such as methyl methacrylate, ethyl acrylate, and acrylonitrile.

One important characteristic of the copolymer component of the size of this invention is that it is nonblocking (i.e., nontacky). A nonblocking polymer is defined as a material which when deposited upon a glass cloth substrate to levels of from 25 to 50 weight percent and the impregnated glass cloth pressed upon itself under a pressure of 1½ pounds per square inch for a period of five minutes will be pulled apart by a force of less than 50 grams per inch when pulled at an angle of 180° at a crosshead speed of fifty inches per minute. It will be recognized that those resins which have no tendency to block under the above test conditions, i.e., to have a peel strength of 0 p.s.i., are the best suited. However, those products having peel strengths of up to 50 grams per inch operate satisfactorily.

The copolymer component of the size of this invention must be a block or graft copolymer as distinguished from a random copolymer since random copolymers made from these monomers are generally tacky or elastomeric. A particularly important characteristic of the conjugated diolefin component of the size of this invention is that at least 50 mole percent and, preferably, at least 75 mole percent of the unsaturation of the copolymer be introduced via 1,2- or 3,4-addition.

In general, the copolymers useful as binder in the sizing compositions of this invention are obtained by the copolymerization of a conjugated diolefin and a vinylic compound to the proper degree of polymerization in suitable hydrocarbon diluents with an organo-lithium catalyst in the presence of cocatalysts. If the polymerization is conducted in the absence of cocatalysts, resins are obtained which cannot be adequately cured.

Cocatalysts well suited for use with the organo-lithium catalyst are amines including diamines, polyamines and the like; ethers including polyethers, cyclic ethers, thioethers, polythioethers, cyclic thioethers, etc. Specific preferred examples of these cocatalysts are pyridine, triethylamine, dimethyl aniline, ethyl ether, butyl ether, diphenyl ether, tetrahydrofuran, tetrahydropyran, m- and p-dioxane, 1,1-dimethoxy ethane, the dialkyl ethers of ethylene glycol, such as 1,2-dimethoxy ethane, tetrahydrothiophene, 3,6-dithiooctane, tetraalkyl ethylene diamine and derivatives of these. The ratio of cocatalyst to catalyst depends upon the structure and properties of the particular cocatalyst, varying from 0.1 to 50 moles cocatalyst/mole catalyst. Higher ratios can be used but it has been found, surprisingly, that undesirable side reactions usually occur at these higher ratios, resulting in products which are very poor in quality and which are not useful as binder components in sizes. An example of a good practical cocatalyst is tetrahydrofuran which can be used at ratios of from one mole per mole of catalyst to 50 moles per mole of catalyst at room temperature, but ratios of 3:1 to 20:1 are preferred.

The method of introducing the monomers during the polymerization is critical. Random polymerization or introduction of monomers simultaneously give an unsatisfactory product. Such a product is elastomeric even at relatively high vinylic olefin contents where cure rates are lower. On the other hand the block or graft copolymerization of the monomers produce satisfactory products. By "block" copolymerization is meant the formation of a copolymer made up of comparatively long sections derived from one monomer followed by segments derived from different monomers, as for example blocks of polybutadiene separated by blocks of polystyrene. Such a copolymer is produced by the alternate introduction of each of the monomers to the reaction zone. "Graft" polymerization is essentially the same as "block" copolymerization except that the graft copolymer may also attach itself laterally to the backbone of the main copolymer.

The diluent for the polymerization reaction is preferably an aromatic hydrocarbon such as benzene, toluene, xylene, alkyl benzenes, chlorobenzenes and the like.

Aliphatic diluents, such as hexane and heptane, can be used but are less desirable due to limited solubility of the conjugated diolefin-vinylic olefin copolymers. In general, any diluent which will not coreact with the organolithium during the course of polymerization may be used. At the completion of the polymerization reaction, the catalyst is inactivated with water, alcohols or other agents and the copolymer solution is washed with water to remove the inorganic residue and some of the cocatalyst, depending on the nature of the cocatalyst. Agents useful for catalyst deactivation are water and alcohols, such as methanol, ethanol, isopropanol, n-hexanol, benzyl alcohol, and the like. Acids or acidic salts may also be used in the wash solution. Alternatively, the solution of the resin either before or after inactivation may be contacted, for example by percolation, with an acid ion-exchange resin to remove the catalysts. Suitable resins available commercially are Dowex-50-X-8 (a strongly acidic cation-exchange resin made by the nuclear sulfonation of styrene-divinylbenzene beads) and Amberlyst 15 (a strongly acidic macroreticular phenol-formaldehyde resin in bead form which is insoluble in nonpolar solvents).

The removal of catalyst residues by water washing can be accomplished by thoroughly agitating a mixture of water and polymer solution at a water/solution volume ratio of from 0.1 to 10. Normally, one water washing is sufficient but more washings can be effected. The remainder of the cocatalyst, and any remaining water, are removed by distillation and/or azeotropic distillation with the diluent. The distallation is continued until the copolymer concentration desired for the impregnating solution has been reached, and the solution is given a polish filtration. Other techniques for the removal of the inorganic residue, such as filtration through wet clay or adddition of alcohol followed by filtration or addition of acids followed by filtration, may also be used with subsequent distillation to remove the cocatalyst and to give the desired solids content.

Clay treatment or clay neutralization is also an effective means of deactivating the catalyst and removing the lithium residues. This process offers a simpler and faster alternative route to the deactivation, water washing and azeotroping steps described above. In this process the reaction mixture is contacted with a mineral type clay to effect the removal of the lithium residues. This may be done by passing the reaction mixture through a bed of clay or by adding the clay to the reaction mixture, then filtering the mixture after it has been contacted for an appropriate length of time.

Examples of mineral clays useful in this process are attapulgite, vermiculite, montmorillonite and the like. The effectiveness of a particular clay will depend upon its moisture content or hydration state, particle size, porosity and ion-exchange capacity. The moisture content of the clay is the most important variable in the removal of the lithium, and the amount of clay used depends upon its moisture content. For this process the moisture content is taken to be the water held by the clay material at relatively low temperatures (see, Grim, Ralph E., "Clay Mineralogy," chapter 8, McGraw-Hill, 1953). This water is determined by the loss in weight on heating the clay in a vacuum oven for one hour at 190° C.

In theory it should take approximately 2.6 grams of this water to remove one gram of the lithium, but in practice it has been found that excellent results are obtained when a ratio of 4 grams of water associated with the clay (determined as above) is used for each gram of lithium. It is also recognized that the contact time between the clay and the reaction mixture can be lowered as this ratio is increased.

The organo-lithium catalyst has the general structure:

where $R_1$, $R_2$, and $R_3$ are selected from the group consisting of hydrogen, an acyclic radical such as methyl, ethyl, propyl, t-butyl, etc., up to $C_{20}$, or alicyclic radicals of from $C_5$ to $C_{12}$ and aromatic radicals of from $C_6$ to $C_{12}$ such as phenyl, tolyl, benzyl, naphthyl, polyalkyl phenyl such as xylyl, etc.

Conjugated diolefins which can be used to prepare suitable copolymer binders for the sizing compositions of this invention are those which have from 4 to 8 carbon atoms per molecule, e.g., 1,3-butadiene, isoprene, piperylene, 2,3-dimethyl - 1,3 - butadiene, 1,3 - hexadiene 2,4 - hexadiene, octadiene, cyclopentadiene, myrcene, allo ocimene etc. Examples of vinylic compounds useful for the other comonomer are vinylic aromatic hydrocarbons such as styrene, α-methyl styrene, and styrenes having alkyl groups substituted on the ring, e.g., paramethyl styrene and 3,4-dimethyl styrene and substituted olefins such as acrylonitrile, methyl methacrylate, vinyl chloride, etc.

The pressure at which polymerization is conducted may vary from below atmospheric (0.1 atmosphere) to 100 atmospheres, preferably 1 atmosphere to 10 atmospheres. The temperature at which polymerization is conducted may vary from −70° C. to 100° C., preferably 0° to 60° C.

The preparation of the copolymers is effected by the gradual addition of monomers to a solution of the catalyst and cocatalyst at a controlled temperature. In a batch process all of the monomer is preferably not added in a single charge since (1) the polymerization becomes too vigorous and causes excessive temperatures which yield products having undesirable properties, and (2) one monomer must be completely reacted before the other is added in order to achieve the block structure required for useful copolymer binders.

The rate of monomer addition is a critical feature of the invention not only because of temperature control but also because, surprisingly, it has been found that the rate of monomer addition has a marked influence on the solution viscosity properties and product quality. By controlling the rate of monomer addition, one can obtain products whose solution viscosities vary quite widely, even though the molecular weight and the percentage of olefin in the polymer are the same.

It has been found that acceptable resins for use as sizing binders are obtained when the monomers are added over a period of up to two hours, while maintaining the temperature between 0° to 60° C., preferably between 15° to 50° C. If the monomers are added over a period exceeding two hours, resins are obtained which are frequently tacky or, in some instances, are milky.

It has been found that good temperature control can be maintained when the monomers are added over a period of fifteen minutes or more. Copolymerizations are best effected by adding the monomers over periods of from thirty minutes to two hours. Under these conditions both temperature and product quality are controllable.

Since the concentration of polymer in diluent will increase with increasing monomer addition in batch processes, it is preferred to maintain the concentration of monomer at from 1 to 50% by weight, preferably 10 to 30% by weight. Too low concentrations are impractical, while too high concentrations result in more viscous solutions resulting in poor heat transfer during polymerization.

Copolymers of conjugated diolefins with vinylic compounds such as styrene, α-methyl styrene and the like prepared as described above can yield solid products over a wide range of feed and reaction conditions, but an increase in the vinylic component content results in a proportionate decrease in the rate of cure. Therefore, the vinyl compound content of the copolymer should lie between 25 and 74 wt. percent.

The number average molecular weights of the copolymers of this invention as determined from kinetic data derived from the ratio of moles of monomer to moles of catalyst should be 3,000 to 30,000, preferably 5,000 to 15,000. The range of proportions of conjugated diolefin and vinylic compound in the copolymer are from fifteen mole percent vinylic compound/85 mole percent conjugated diolefin to 60 mole percent vinylic compound/40 mole percent conjugated diolefin, preferably 25 mole percent vinylic compound/75 mole percent conjugated diolefin to 40 mole percent vinylic compound/60 mole percent conjugated diolefin.

It should be pointed out that in batch processes, only the time of monomer addition is critical at a given temperature once the catalyst and cocatalyst are contacted. Residence time after monomer addition is completed has no effect on copolymer properties.

The figure of the drawing illustrates a schematic view of applying the sizing solution to the individual fibers during their formation. Throughout this specification, the terms "solution" and "emulsions" are used interchangeably. The sizing solution is applied to the individual fibers 10 just after their emergency from orifices 11 in an electrically heated, platinum alloy bushing 12 containing molten glass 13. The sizing solution is applied to the filaments prior to or at the same time they are grouped together to form a strand by means of a roller applicator 18 which is composed of a rotating roller 19 partially submerged in the sizing solution 20 contained in a reservoir 22. Such an applicator is shown in more detail in U.S. Patent No. 2,728,972. The fibers are grouped into a strand by a graphite guide 24 and wound around a forming tube 26 rotating at approximately 7500 r.p.m. to produce a strand travel of approximately 12,000 to 15,000 feet per minute. Other methods of applying the size to the strand of glass fibers, such as a pad applicator, may be employed and the strand may be formed by means other than winding on the forming tube, such as by means of a pair of rotating wheel pullers which direct the strand into a suitable collecting device.

The glass fiber strands are wound on the forming tube 26 and then dried. This may be done by heating them while on the forming tube at a temperature and for a length of time sufficient to remove substantially all of the water, for example, at about 240° to 300° F., preferably 275° °F., for 8 hours. This drying not only removes the moisture, but causes the sizing to fix itself to the glass surface and to produce the degree of strand integrity and hardness required for forming the strand into roving and yarn and fabricating the roving and yarn into proper form for resin or elastomer reinforcement.

The sized strands can be further coated with an elastomeric layer by dipping them in either an elastomeric latex or an elastomeric solution.

The invention is further illustrated by the following examples. In the examples, all percents are weight percents unless otherwise indicated. All moles percent are based on the same unit of weight.

EXAMPLES 1 TO 12

A series of butadiene-styrene block copolymers containing varying amounts of styrene (5 mole percent to 60 mole percent) were prepared in the following manner.

A 2 l. flask was charged under $N_2$ with 1 l. of dry toluene, 21 ml. of purified, anhydrous, peroxide-free tetrahydrofuran and 0.025 mole of butyl lithium. 1,3-butadiene was slowly added to the stirred catalyst solution over periods of eighteen minutes to forty-five minutes at a temperature of 28±3° C., until the desired amount of butadiene had been added. Thereafter styrene was added over periods of ninety minutes to twenty minutes until the desired amount of styrene had been added. In all cases the mole ratio of total monomers to alkyl lithium was 200 to 1. Stirring was continued for thirteen to eighteen hours after the addition of the styrene.

The copolymers were isolated by precipitating with methanol in a Waring blender, followed by two washings with methanol which contained a small amount of 2,6-di-t-butyl-p-cresol as oxidation inhibitor, then filtering and drying in a vacuum oven at 40° C. for approximately sixteen hours. The yields ranged from 95% to quantitative. All of the products were white in color, the products with low styrene contents being tacky semisolids, while those with high styrene contents were free-flowing soilds. The physical appearance of the copolymers is set forth in Table I following.

TABLE I.—CHARACTERISTICS OF BUTADIENE-STYRENE BLOCK COPOLYMERS

| Example No. | Mole percent styrene in resin | Physical appearance of resin | Block characteristics strength, g. per inch |
|---|---|---|---|
| 1 | 5 | Tacky semisolid | 168 |
| 2 | 10 | do | 283 |
| 3 | 15 | Slightly tacky-rubbery solid | 23 |
| 4 | 20 | Rubbery solid | 0 |
| 5 | 25 | Free-flowing solid | 0 |
| 6 | 30 | do | 0 |
| 7 | 35 | do | 0 |
| 8 | 40 | do | 0 |
| 9 | 45 | do | 0 |
| 10 | 50 | do | 0 |
| 11 | 55 | do | 0 |
| 12 | 60 | do | 0 |

It was found that those block copolymers containing less than about 25 mole percent (39 wt. perecent) were unsuitable for use as binders in a sizing composition since they generally would not cover the glass fibers properly and imparted so much tackiness to the final size that it was extremely difficult to handle the glass fibers containing the tacky copolymers. In general, it was found that even though styrene contents of up to 60 mole percent (74 wt. percent) were sometimes useful, the most preferable block copolymers for use as binders in sizing compositions were those containing between approximately 25 to 35 mole percent (39 to 50 wt. percent) of styrene.

It has also been found that solid graft copolymers of vinyl aromatics and $C_4$ to $C_8$ conjugated diolefins, especially styrene and butadiene where the backbone polymer is made from the diolefin (i.e., butadiene) when these are solids with a molecular weight below 15,000 and about 1,000 (number average), are equally satisfactory as binders in sizing compositions. The backbone polymer can be made in any conventional manner by polymerizing the diolefin. The styrene is grafted on by peroxide polymerization. Copolymers with as low as 20 wt. percent of styrene and as high as 50 wt. percent are satisfactory.

The important point is that randomly polymerized copolymers are generally not satisfactory, but block copolymers, graft copolymers and other nonrandomly copolymerized polymers that are solid and have a styrene content of from 20 to 50 wt. percent are generally satisfactory.

EXAMPLE 13

(A) Copolymer preparation

A block copolymer of butadiene-styrene containing 39 wt. percent of the latter was prepared using tetrahydrofuran and toluene as the solvent and butyl lithium as the catalyst. The butadiene was first added and polymerized and then the styrene. The procedure used was that described for Examples 1 to 12 above. The copolymer obtained was a nontacky solid of about 13,000 molecular weight, and having approximately 85% of its unsaturation present as vinyl groups. A 55% solution of the copolymer in toluene was prepared which had a viscosity of 3 poises. It should be noted that it is possible to use the solution of copolymer in reacting diluent directly rather than isolating the copolymer and subsequently dissolving it in an organic solvent preparatory to preparing an emulsion.

(B) Copolymer emulsion preparation

This solution was emulsified to produce an emulsion containing about 26 wt. percent of solids by adding the copolymer solution to about twice its volume of water containing less than one part by weight of a nonionic emulsifying agent prepared by reacting together nonyl phenol and ethylene oxide so that 8 to 10 moles of ethylene oxide combine with every mole of nonyl phenol. The solution was added slowly to the water/emulsifier solution while agitating with a high shear Eppenback homogenizer.

(C) Size preparation

A size was prepared utilizing the above-described emulsion and other ingredients in the following amounts to make 2.5 gallons of size:

Copolymer emulsion (26% solids) _____grams__ 1350
Cirrasol 185–A [1] (lubricant) _____do____ 22.7
Z–6030 [2] (coupling agent) _____do____ 50
Acetic acid _____cc__ 1
Water, sufficient to form 2½ gallons.

[1] Described above.
[2] Gamma-methacryloxypropyl trimethoxysilane.

The size preparation was as follows: The emulsion was dispersed in 1½ gallons of water by stirring. The Z–6030 coupling agent was added to 600 grams of water and the acetic acid was added to this with stirring (about 15–30 minutes) until the solution became clear. The Cirrasol was added to 400 grams of hot (180° F.) water with stirring to form a clear, brownish-yellow solution. Sufficient water was then added to form 2½ gallons of size containing the above ingredients.

(D) Application of size to glass fibers

This size was applied to glass filaments in the conventional manner as described with respect to the drawing, immediately after the filaments were formed. The sized filaments were gathered into a strand at high speeds on a forming tube and then dried for 5 hours at 250° F. The sized strands were then fabricated into a 20-end roving package by conventional methods.

(E) Laminates prepared from sized glass fibers

The 20-end roving was unwound and passed through a bath of the following resin to impregnate with the resin:

| | Parts by weight |
|---|---|
| Buton–A–500 [1] | 50 |
| Vinyl toluene | 50 |
| Divinyl benzene (55%) [2] | 5 |
| Dicumene peroxide | 2 |
| Di-t-butyl peroxide | 2 |

[1] A viscous resin prepared from 80 wt. percent butadiene and 20 wt. percent styrene of about 2,200 ml. wt. prepared by sodium catalysis.
[2] Other 45% was primarily ethyl vinyl benzene.

The impregnated roving was wound around an H-type cavity mold and cured between parallel plates at approximately 500 p.s.i. for ½ hour at 300° F., followed by ½ hour at 320° F. The laminate obtained was 0.121 inch in thickness and had a flexural strength of 80,000 p.s.i. as determined with ASTM D–790.

(F) Comparison of laminates

A laminate prepared as in Example 13(E) but using a roving having the usual polyvinyl acetate in place of the copolymer as binder in the sizing had a flexural strength of only 64,165 p.s.i. The test method of ASTM D–790 was used.

Specimens from each laminate were placed in boiling water for one week and then tested for flexural strength according to ASTM D–790. The specimen prepared with the roving sized with the size containing the butadiene-styrene resin binder retained a strength of 79,000 p.s.i. while that prepared with the sizing with polyvinyl acetate binder had a flexural strength of only 18,250 p.s.i.

This experiment demonstrates the vast superiority of the solid butadiene-styrene resin of high 1,2-type unsaturation as the binder in sizings used for rovings to be subsequently used for filament wound structures of hydrocarbon thermosetting resins.

This type of sized roving also proved to be superior to polyvinyl acetate sized rovings when used in chopped form in both thermosetting and thermoplastic resins of the hydrocarbon type.

EXAMPLE 14

A blocked copolymer was prepared exactly as described in Example 13 except that 45 wt. percent styrene was used. An emulsion containing about 26 wt. percent of solids was also prepared from a 55 volume percent solution of the copolymer in toluene similarly to the process described in Example 13 above.

A 2.8 wt. percent of a water solution of gamma aminopropyl triethoxy silane was also prepared. Proportions of the emulsion, silane solution and additional water were blended together in order to give a final composition containing 4 wt. percent of the resin and 1.4 wt. percent of the silane solution, based on total size.

Three samples of HG–28 cloth (taffeta weave of 42 x 32 construction) which had been well heat-cleaned of the original starch oil sizing were coated with a thin film of a composition described as follows:

Sample A

With the above-described final emulsion composition.

Sample B

With the above described emulsion plus 2 parts by weight of Di-Cup (dicumyl peroxide) and 2 parts by weight of Lupersol–101 (2,5-dimethyl-2,5-ditertiary butyl peroxy hexane) based on 100 parts of copolymer.

Sample C

With 1.4 wt. percent of the aqueous gamma aminopropyl triethoxy silane solution described above.

Standard strip adhesion tests were run after treating each of the three samples of treated glass with a sheet of rubber compounded from the following ingredients to make corresponding test specimens.[1]

| | Parts by weight |
|---|---|
| Neoprene WRT (a stabilized chloroprene polymer free of sulfur additives) | 100 |
| Fine thermal black | 50 |
| Magnesium oxide | 0.5 |
| Zinc oxide | 5 |
| Stearic acid | 0.5 |
| Dibutyl phthalate | 10 |

The samples (test specimens) were then cured at 307° F. for 60 minutes.
The resulting adhesion values were as follows.

| Sample No.: | Adhesion lbs./inch |
|---|---|
| A | 52 |
| B | 52 |
| C | 52 |

This example demonstrates that the presence of the copolymer on the glass does not interfere with the adhesion of the glass to the rubber.

[1] In preparing the test specimens, the layer of cloth is sandwiched between two layers of the sheeted rubber compound, each about 90 mils thick. This assembly is then placed between canvas sheets or other backing. A piece of polyester (Mylar) film is inserted at either end of the sample between the rubber and glass fabric to provide an opening for a start of the subsequent test. The canvas or equivalent backing serves to reinforce the rubber to allow a strong force when an attempt is made to pull the rubber from the glass. Samples were press-cured under 250- to 500-p.s.i. pressure in a cavity mold. One-inch-wide specimens were died out of the moldings and strip adhesions were run with an Instron tester at a jaw separation rate of 2 inches per minute.

EXAMPLE 15

The resin emulsion of Example 14 above was formulated into a sizing solution (emulsion) with the following formulation:

| | Parts by weight |
|---|---|
| Copolymer emulsion of Example 14 | 3.1 |
| Cirrasol 185-A (lubricant) | 0.2 |
| Gamma-aminopropyl triethoxy silane (amino silane) | 0.5 |
| Glycidoxypropyl trimethoxy silane (epoxy silane) | 0.5 |
| Alkylated melamine formaldehyde resin (plasticizer) | 0.7 |
| Water | 95.0 |

The above composition was used to size glass filaments in a conventional manner, such as described above with respect to the drawing, immediately after the filaments were formed. The resultant sized filaments were gathered into strands after drying and could be twisted and piled on standard fiber glass textile equipment with satisfactory yarns being produced.

The above composition was also used for treating heat cleaned HG-28 cloth, which was air dried and then heated 30 minutes at 212° F. The cloth was used in the standard adhesion test with the rubber composition of Example 14. Adhesion values of 34.5 lbs./inch were obtained.

EXAMPLE 16

A solution blend of the copolymer of Example 13 was prepared as follows:

| | Parts |
|---|---|
| Butadiene-styrene, block copolymer | 4 |
| Methacryloxypropyl trimethoxy silane, ⅓ hydrolyzed | 1 |
| Toluene | 95 |
| Dicumene peroxide | 0.08 |
| Lupersol 101[1] | 0.08 |

[1] 2,5-dimethyl 2,5-ditertiary butyl peroxy hexane.

The above solution was used for treating heat cleaned HG-28 glass cloth, air dried and then heated at 212° F. for 15 minutes. The cloth was then used in the standard adhesion test described in Example 14 with the following compounded rubber (NBR).

| | Parts |
|---|---|
| Paracril C (butadiene-acrylonitrile copolymer containing about 35% nitrile (U.S. Rubber) | 100 |
| SRF black | 50 |
| Aminox (U.S. Rubber condensation product of an aldehyde and a secondary amine) | 0.5 |
| Zinc oxide | 5 |
| Stearic acid | 1 |
| Dibutyl phthalate | 15 |
| Dicup-40 HAF (40% dicumene peroxide deposited on high abrasion furnace black) | 3.75 |

The cure was at 307° F. for 20 minutes. The adhesion was 45 lbs. for a one inch wide strip.

The adhesion test was repeated but the copolymer omitted. The adhesion was 37½ lbs. The adhesion test was repeated, but the silane was omitted from the treating solution. The adhesion was only two pounds. These tests show that the silane is essential to get adhesion and the copolymer added to the glass surface along with the silane does not interfere with the silane-rubber adhesion, but actually enhances it.

EXAMPLE 17

Regular strip adhesion tests as described in Example 14 were run using the three samples of treated glass with the following rubber compound:

| | Parts |
|---|---|
| SBR-1500 [1] | 100 |
| Semi-reinforcing furnace black | 50 |
| Aminox | 0.5 |
| Zinc oxide | 5 |
| Stearic acid | 1 |
| Santocure-NE [2] | 0.4 |
| Sulfur | 2.5 |

[1] General purpose cold rubber made by emulsion from styrene/butadiene, about 23.5% styrene.
[2] N-tert-butyl-2-benzothiazole-sulfenamide.

Cure was at 292° F. for 45 minutes.
Adhesion values were as follows—

| Sample No.: | Adhesion, lbs./inch |
|---|---|
| A | 33½ |
| B | 30 |
| C | 30½ |

These data show that the butadiene-styrene resin in the sizing will not interfere with the aminosilane-sulfur cured elastomer bonding when a sizing containing such a silane and this binder is used on the fibrous glass when drawn.

EXAMPLE 18

A solid copolymer of butadiene and styrene was prepared by grafting (with benzoyl peroxide) styrene on to a polybutadiene of about 2,300 molecular weight which had been prepared by sodium catalysis. The styrene content of the copolymer was about 20 wt. percent. This was applied to heat cleaned satin weave of 57 x 54 construction glass cloth as described for the resin used in Example 16, but modified in that ⅓ hydrolyzed A-172 (vinyl silane ester of the monomethyl ether of ethylene glycol obtained from Union Carbide) was used instead of the methacryloxy silane. Adhesion using the NBR rubber compound was 44 pounds. When omitting the graft copolymer from the solution, the adhesion was only 19 lbs./inch. Tests with the graft polymer in a sizing emulsion showed that it served as an excellent binding agent for the fibrous glass strand.

What is claimed is:
1. A method of forming sized glass fiber strands which can be fabricated and laminated with a resin or which can be used to reinforce elastomers and plastics which comprises:
 (1) drawing glass streams through orifices in a bushing to form individual glass filaments,
 (2) moving the filaments away from the bushing at a high rate of speed and forming them into a strand,
 (3) applying to the filaments while they are moving at this speed a sizing composition comprising:
  (a) a major proportion of a liquid carrier medium,
  (b) from 1 to 10 wt. percent of a non-blocking, solid below 125° F., resinous unsaturated copolymer of 15 to 60 mole % of a vinylic aromatic and a $C_4$ to $C_8$ diolefin wherein the unsaturation of said copolymer imparted by said diolefin is at least 50% 1,2- or 3-4-type unsaturation and the number average molecular weight of said copolymer is about 1000 to 30,000,
  (c) 0.2 to 2 wt. percent of a hydrolyzable silane having the general formula

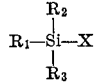

where $R_1$ is selected from the group consisting of alkenyl, amino-alkyl, epoxy alkyl, epoxy aryl, epoxy aralkyl, epoxy cycloalkyl, mercapto alkyl, acryloxyalkyl and methacryloxy alkyl; X is selected from the group consisting of halogen, hydroxyl and alkoxy; and $R_2$ and $R_3$ are each independently selected from the group consisting of $R_1$, X and methyl and 0.1 to 1.0 wt. percent of a glass fiber lubricating agent all based on the weight of said sizing composition, and (4) drying the glass fibers so treated.

2. The method of claim 1 wherein said vinyl aromatic is styrene and said diolefin is butadiene.

3. The method of claim 2 wherein said copolymer contains between 39 to 50 wt. percent of styrene.

4. The method of claim 1 wherein said lubricating agent is a tetraethylene pentamine-pelargonic acid condensate.

5. The method of claim 1 wherein said silane is glycidoxy-propyl trimethoxy silane.

6. The method of claim 1 wherein said silane is gamma aminopropyl triethoxy silane.

7. A method according to claim 1 wherein from 1 to 6 wt. percent of a free radical catalyst is also present in the sizing composition based on the amount of said copolymer present.

8. The method of claim 1 wherein from 3 to 5 wt. percent of said solid unsaturated copolymer having from 39 to 50 wt. percent of vinyl aromatic, .4 to .9 wt. percent of silane and 0.2 to 0.4 wt. percent of glass fiber lubricating agent are present in said sizing composition.

9. A method of forming sized glass fiber strands which can be fabricated and laminated with a resin or which can be used to reinforce elastomers and plastics which comprises:

(1) drawing glass streams through orifices in a bushing to form individual glass filaments, (2) moving the filaments away from the bushing at a high rate of speed and forming them into a strand, (3) applying to the filaments while they are moving at this speed an aqueous sizing composition comprising:

(a) a major proportion of water, (b) from 1 to 10 wt. percent of a normally solid unsaturated copolymer of styrene and butadiene having a styrene content of from 39 to 50 wt. percent wherein said copolymer has at least 50 mole percent of its unsaturation introduced via addition of the 1,2- or 3,4-type and has been prepared by a technique which results in block copolymers, (c) 0.2 to 2 wt. percent of hydrolyzed gamma aminopropyl triethoxysilane, (d) 0.1 to 1.0 wt. percent of a condensate of tetraethylene pentamine with pelargonic acid, (e) 0.01 to 1 wt. percent of a wetting agent, all of the foregoing percentages being based on the weight of said sizing composition, (f) 0.1 to 3 wt. percent of antioxidant based on the total weight of solids, and (4) drying the glass fibers so treated.

References Cited

UNITED STATES PATENTS

| | | | |
|---|---|---|---|
| 2,877,501 | 3/1959 | Bradt. | |
| 3,168,389 | 2/1965 | Eilerman | 65—3 |
| 3,215,585 | 11/1965 | Kneipple | 65—3 |
| 3,369,926 | 2/1968 | Eakins | 65—3 |
| 3,264,156 | 8/1966 | Vanderbilt et al. | |

OTHER REFERENCES

Boundy, Ray H. and Boyer, Raymond F., Styrene, its Polymers, Copolymers and Derivatives, Reinhold Pub. Co., New York (1952).

LEON BASHORE, Primary Examiner

R. L. LINDSAY, Jr., Assistant Examiner

U.S. Cl. X.R.

57—153; 117—126; 161—76; 260—41.5